United States Patent
Helmes et al.

(10) Patent No.: US 10,437,411 B2
(45) Date of Patent: Oct. 8, 2019

(54) RECONFIGURABLE CLIP-ON MODULES FOR MOBILE COMPUTING DEVICES

(71) Applicant: Microsoft Technology Licensing, LLC, Redmond, WA (US)

(72) Inventors: John Helmes, Tegelen (NL); Stuart Taylor, Cambridge (GB); Stephen E. Hodges, Cambridge (GB); Nicolas Villar, Cambridge (GB); James W. Scott, Cambridge (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/650,769

(22) Filed: Jul. 14, 2017

(65) Prior Publication Data
US 2017/0315678 A1  Nov. 2, 2017

Related U.S. Application Data

(60) Continuation of application No. 14/513,051, filed on Oct. 13, 2014, which is a division of application No.
(Continued)

(51) Int. Cl.
*G06F 3/0481* (2013.01)
*A63F 13/20* (2014.01)
(Continued)

(52) U.S. Cl.
CPC ............ *G06F 3/0481* (2013.01); *A63F 13/06* (2013.01); *A63F 13/23* (2014.09); *A63F 13/24* (2014.09);
(Continued)

(58) Field of Classification Search
CPC .............................. G05G 9/047; G06F 1/1679
See application file for complete search history.

(56) References Cited

U.S. PATENT DOCUMENTS

| | | | |
|---|---|---|---|
| 4,459,578 A | 7/1984 | Sava et al. | |
| 5,865,546 A | * 2/1999 | Ganthier | ............... G06F 3/0202 341/22 |

(Continued)

FOREIGN PATENT DOCUMENTS

| | | |
|---|---|---|
| CN | 101122809 A | 2/2008 |
| CN | 201283220 Y | 8/2009 |

(Continued)

OTHER PUBLICATIONS

Engadget. "FlipSide case for iPhone packs stealthy game controls, plays on solar power (video)" https://www.engadget.com/2012/12/23/flipside-case-for-iphone-packs-stealthy-game-controls/. Dec. 12, 2012.*

(Continued)

*Primary Examiner* — Reginald A Renwick
(74) *Attorney, Agent, or Firm* — Alleman Hall Creasman & Tuttle LLP

(57) ABSTRACT

A set of reconfigurable clip-on modules for mobile computing devices includes two or more modules and at least one of the modules has an input button or other control and at least one of the modules can communicate with the computing device without needing to be connected to it via a wire. The input button is mapped to a user input in a program, such as a game, which is running or displayed on the computing device to which the modules are clipped. In an embodiment, user inputs via the buttons or other controls on the clip-on modules are mapped to user inputs in a game running on the device, which may be a touch-screen device, and the mapping between user inputs via the buttons and
(Continued)

user inputs in the game may change dependent upon the game being played, user preference, or other criteria.

18 Claims, 9 Drawing Sheets

Related U.S. Application Data

13/745,658, filed on Jan. 18, 2013, now Pat. No. 8,858,335.

(51) Int. Cl.
  *G06F 1/16* (2006.01)
  *G06F 3/0484* (2013.01)
  *A63F 13/23* (2014.01)
  *A63F 13/24* (2014.01)

(52) U.S. Cl.
  CPC ........ *G06F 1/1632* (2013.01); *G06F 3/04847* (2013.01)

(56) References Cited

U.S. PATENT DOCUMENTS

| | | | |
|---|---|---|---|
| 6,530,838 B2 * | 3/2003 | Ha | A63F 13/06 463/36 |
| 6,903,662 B2 | 6/2005 | Rix et al. | |
| 7,432,461 B2 | 10/2008 | See | |
| 7,580,728 B2 | 8/2009 | Vance et al. | |
| 7,653,771 B2 | 1/2010 | Liberty | |
| 7,733,637 B1 | 6/2010 | Lam | |
| 7,833,097 B1 | 11/2010 | Maddox et al. | |
| 8,310,351 B2 | 11/2012 | Krahenbuhl et al. | |
| 8,323,106 B2 | 12/2012 | Zalewski | |
| 8,417,296 B2 | 4/2013 | Caballero et al. | |
| 8,462,133 B2 | 6/2013 | Lynch et al. | |
| 8,529,357 B2 | 9/2013 | Joynes et al. | |
| 8,547,340 B2 | 10/2013 | Sizelove et al. | |
| 8,634,873 B2 | 1/2014 | Jones et al. | |
| 8,798,453 B2 | 8/2014 | Lawton | |
| 8,858,335 B2 | 10/2014 | Helmes et al. | |
| 8,882,597 B2 | 11/2014 | Nicholson | |
| 8,944,912 B2 | 2/2015 | Joynes et al. | |
| 8,972,617 B2 * | 3/2015 | Hirschman | G06F 3/0219 463/37 |
| 9,075,447 B2 | 7/2015 | Tseng | |
| 2002/0155890 A1 | 10/2002 | Ha et al. | |
| 2005/0107165 A1 | 5/2005 | Mendelson et al. | |
| 2005/0225530 A1 | 10/2005 | Evans et al. | |
| 2005/0248526 A1 | 11/2005 | Twerdahl et al. | |
| 2006/0250351 A1 | 11/2006 | Fu | |
| 2006/0252537 A1 | 11/2006 | Wu | |
| 2006/0286943 A1 | 12/2006 | Vance et al. | |
| 2008/0076559 A1 | 3/2008 | Richardson et al. | |
| 2009/0033522 A1 | 2/2009 | Skillman et al. | |
| 2010/0081505 A1 | 4/2010 | Alten et al. | |
| 2011/0021269 A1 | 1/2011 | Wolff-Peterson et al. | |
| 2011/0199325 A1 | 8/2011 | Payne | |
| 2011/0230178 A1 | 9/2011 | Jones et al. | |
| 2011/0260919 A1 | 10/2011 | Montag et al. | |
| 2011/0260969 A1 | 10/2011 | Workman | |
| 2012/0015743 A1 | 1/2012 | Lam et al. | |
| 2013/0005401 A1 | 1/2013 | Rosenhan et al. | |
| 2013/0052956 A1 | 2/2013 | Mckell | |
| 2013/0095925 A1 | 4/2013 | Xu | |
| 2013/0184077 A1 | 7/2013 | Galpern | |
| 2013/0267322 A1 * | 10/2013 | South | A63F 13/06 463/38 |
| 2013/0341214 A1 | 12/2013 | King et al. | |
| 2014/0111912 A1 | 4/2014 | Gobeil | |
| 2014/0184508 A1 | 7/2014 | Tamasi et al. | |
| 2014/0206451 A1 | 7/2014 | Helmes et al. | |
| 2014/0247246 A1 | 9/2014 | Maus | |
| 2015/0281422 A1 | 10/2015 | Kessler et al. | |

FOREIGN PATENT DOCUMENTS

| | | |
|---|---|---|
| CN | 202237223 U | 5/2012 |
| CN | 202427153 U | 9/2012 |
| CN | 202860081 U | 4/2013 |
| CN | 203342350 U | 12/2013 |
| CN | 203355266 U | 12/2013 |
| CN | 103631394 A | 3/2014 |
| CN | 103721415 A | 4/2014 |
| EP | 1637984 A2 | 3/2006 |
| EP | 1721644 A | 11/2006 |
| EP | 2311539 A2 | 4/2011 |
| JP | 2009087081 A | 4/2009 |
| TW | 200927240 A | 7/2009 |
| WO | 2007048043 A2 | 4/2007 |

OTHER PUBLICATIONS

"First Office Action and Search Report Issued in Chinese Patent Application No. 201480005350.5", dated Jan. 29, 2018, 15 Pages.
"Non Final Office Action Issued in U.S. Appl. No. 14/513,051", dated Oct. 19, 2017, 16 Pages.
"Office Action Issued in Taiwan Patent Application No. 103101835", dated Oct. 26, 2017, 10 Pages.
"International Preliminary Report on Patentability Issued in PCT Application No. PCT/US2014/011368", dated May 28, 2015, 10 Pages.
"Second Written Opinion Issued in PCT Application No. PCT/US2014/011368", dated Mar. 25, 2015, 7 Pages.
Evans, J., "Mad Catz MIDI PRO-Adapter", Legit Reviews Website, Available Online at http://www.legitreviews.com/article/1523/1/, Jan. 12, 2011, 1 page.
Openmoko, "Wish List—Hardware", Openmokowiki Website, Available Online at http://wiki.openmoko.org/wiki/Wish_List_-_Hardware, Apr. 6, 2011, 25 pages.
Technicalmarkus, "Ice Cream Sandwich lets you use game controllers on your Android phone," Mobile Phone Blog Website, Retrieved Online at http://www.mobileshop.com/blog/mobile-phone-blogs/ice-cream-sandwich-lets-you-use-game-controllers-on-your-android-phone, Oct. 25, 2011, 1 page.
Hatfield, D., "Gametel Game Controller Now Supports iPhone and iPad," MTV Multiplayer Website, Retrieved Online at http://multiplayerblog.mtv.com/2012/01/06/gametel-game-controller-now-supports-iphone-and-ipad/, Jan. 6, 2012, 2 pages.
Newman, J., "Smartphones and Tablets Get Their Gaming Buttons," Technologizer Website, Available Online at http://www.technologizer.com/2012/01/08/smartphones-and-tablets-get-their-gaming-buttons/, Jan. 8, 2012, 4 pages.
Kuchera, B., "Mad Catz releases the MLG console controller: for $100 you can have it your way," Ars Technica Website, Available Online at https://arstechnica.com/gaming/2012/01/mad-catz-offers-the-mlg-console-controller-for-100-you-can-have-it-your-way/, Jan. 11, 2012, 2 pages.
Cummings, C., "DRONE Controller Turns Your Smartphone Into a Console," Techli Website, Available Online at http://techli.com/2012/03/drone-controller, Mar. 21, 2012, 3 pages.
"Bluetooth Stereo Headset—Blumax Clip", Blumax Website, Available Online at http://blu-max.com/products/bluetooth_headset_clip.html, Apr. 12, 2012, 1 page.
Willington, R., "Wikipad Gaming Tablet Coming With Android 4.0, Controller Add-On," Hot Hardware Website, Available Online at https://hothardware.com/news/wikipad-gaming-tablet-coming-with-android-40-controller-addon, May 4, 2012, 1 page.
Moore, N., "The PowerA MOGA brings console-like game controls to Android phones," New Atlas Website, Available Online at http://www.gizmag.com/powera-moga/22794/, Jun. 3, 2012, 5 pages.
Glenn, "NVIDIA and Nyko Will Offer PlayPad Controllers to Tegra-Based Devices," The Droid Guy Website, Available Online at https://thedroidguy.com/2012/06/nvidia-and-nyko-will-offer-playpad-controllers-to-tegra-based-devices-23981, Jun. 7, 2012, 4 pages.
Perry, D., "PowerA's MoGa Turns Phones Into PS Vita and DS Rivals," Tom's Guide Website, Available Online at https://www.

(56) References Cited

OTHER PUBLICATIONS tomsguide.com/us/powera-moga-controller-android-gaming,news-15509.html, Jun. 26, 2012, 2 pages.
"Mobile Gaming controller," Alibaba Website, Retrieved Online at http://www.alibaba.com/cache/Mobile-Gaming-controller_453473204.html, Aug. 2012, 3 pages.
Lee, C., "Introducing Bladepad, the detachable iPhone gamepad," iDownload Blog Website, Available Online at http://www.idownloadblog.com/2012/08/06/detachable-iphone-gamepad/, Aug. 6, 2012, 2 pages.
"GameKlip: Fusion of Android smartphones and PS3," PCGerms Website, Retrieved Online at http://www.pcgerms.com/gameklip-fusion-of-android-smartphones-and-ps3-controllers, Aug. 7, 2012, 2 pages.
"Play your Android Games in style; Check out this homemade PS3 controller Samsung Galaxy Nexus dock," My Android Gadgets Website, Retrieved Online at http://myandroidgadgets.com/play-your-android-games-in-style-check-out-this-homemade-ps3-controller-samsung-galaxy-nexus-dock, Aug. 24, 2012, 4 pages.
"Sixaxis Controller App—Use your PS3 Controller to Play Android Games," Tech Gadget News Website, Retrieved Online at http://techgadgetsnews.com/sixaxis-controller-app-use-your-ps3-controller-to-play-android-games, Available as Early as Aug. 24, 2012, 1 page.
Fingas, J., "FlipSide case for iPhone packs stealthy game controls, plays on solar power," Engadget Website, Available Online at https://www.engadget.com/2012/12/23/flipside-case-for-iphone-packs-stealthy-game-controls/, Dec. 23, 2012, 13 pages.
United States Patent and Trademark Office, Requirement for Restriction Issued in U.S. Appl. No. 13/745,658, dated Sep. 12, 2013, 6 pages.
United States Patent and Trademark Office, Non-Final Office Action Issued in U.S. Appl. No. 13/745,658, dated Dec. 16, 2013, 9 pages.
United States Patent and Trademark Office, Notice of Allowance Issued in U.S. Appl. No. 13/745,658, dated May 28, 2014, 5 pages.
ISA European Patent Office, International Search Report and Written Opinion Issued in PCT Application No. PCT/US2014/011368, dated Nov. 6, 2014, WIPO, 21 pages.
United States Patent and Trademark Office, Non-Final Office Action Issued in U.S. Appl. No. 14/513,051, dated Dec. 4, 2015, 9 pages.
United States Patent and Trademark Office, Final Office Action Issued in U.S. Appl. No. 14/513,051, dated Jun. 17, 2016, 14 pages.
United States Patent and Trademark Office, Non-Final Office Action Issued in U.S. Appl. No. 14/513,051, dated Oct. 20, 2016, 14 pages.
United States Patent and Trademark Office, Final Office Action Issued in U.S. Appl. No. 14/513,051, dated Apr. 21, 2017, 14 pages.
"Playstation® Vita", Retrieved From <<https://web.archive.org/web/20110929051332/http:/scei.co.jp/corporate/release/pdf/110914a_e.pdf>>, Dec. 17, 2011, 9 Pages.
"Notice of Allowance Issued in U.S. Appl. No. 14/553,491", dated Aug. 17, 2016, 7 Pages.
"Response to Office Action Filed in EP Application No. 14708124.4", Filed Date: Mar. 26, 2016, 15 Pages.
"LG Versa Game Pad Released", Retrieved From << http://www.firstpost.com/tech/lg-versa-game-pad-released-3565339.html>>, Apr. 23, 2009, 7 Pages.
"Project Fiona Gaming Tablet Coming to Market as Razer Edge", Retrieved From <<https://newatlas.com/razer-edge-project-fiona/25695/>>, Jan. 9, 2013, 5 Pages.
"Notice of Allowance Issued in U.S. Appl. No. 14/553,491", dated Apr. 12, 2016, 7 Pages.
"Charging without Wires", Retrieved From: http://batteryuniversity.com/learn/article/charging_without_wires, May 13, 2012, 5 Pages.
"DUALSHOCK® 3 Wireless Controller", Retrieved From: https://web.archive.org/web/20101122142951/http://us.playstation.com/ps3/accessories/dualshock-3-wireless-controller-ps3.html, Nov. 22, 2010, 2 Pages.
"Gamepad", Retrieved From: https://www.scirra.com/manual/143/gamepad, Sep. 17, 2012, 5 Pages.
"Gametel", Retrieved From: http://gametel.se/, Sep. 17, 2014, 2 Pages.

"GameVice", Retrieved From: https://web.archive.org/web/20140912044019/http://www.gamevice.com/, Retrieved on: Sep. 17, 2014, 3 Pages.
"Ion iCade", Retrieved From: https://web.archive.org/web/20140508053648/http://www.ionaudio.com/products/details/icade, Sep. 17, 2014, 2 Pages.
"MOGA Ace Power", Retrieved From: https://web.archive.org/web/20140211171555/http://www.mogaanywhere.com/ace/, Sep. 17, 2014, 5 Pages.
"MOGA Pocket Controller", Retrieved From: https://web.archive.org/web/20140213223521/http://store.mogaanywhere.com/Products/CPFA000253-01, Aug. 31, 2017, 3 Pages.
"Nvidia Shield", Retrieved From: https://web.archive.org/web/20130916235353/http://shield.nvidia.com/, Feb. 17, 2016, 3 Pages.
"PG-9023 wireless bluetooth game controller for mobile phone tablet PC", Retrieved From: https://www.alibaba.com/cache/PG-9023-wireless-bluetooth-game-controller_2006404292.html, Sep. 13, 2014, 6 Pages.
"Phonejoy", Retrieved From: https://web.archive.org/web/20140802080635/http://phonejoy.com/, Sep. 17, 2014, 3 Pages.
"PlayStation 3 Wireless Sixaxis Controller", Retrieved From: http://www.amazon.com/PlayStation-3-Wireless-Sixaxis-Controller/dp/BOOOK1CS5Y, Sep. 18, 2014, 5 Pages.
"Pocket Gamer: Video Game Controller for iPhone", Retrieved From: https://web.archive.org/web/20160822152550/https://www.kickstarter.com/projects/1685918106/pocket-gamer, Aug. 31, 2017, 25 Pages.
"Psyclone TouchCharge Kit Review: Wireless Charging Comes to Game Controllers", Retrieved From: http://www.popularmechanics.com/technology/gadgets/a12223/4294717/, Sep. 18, 2014, 3 Pages.
"Range of iPega Controllers", Retrieved From: http://www.amazon.co.uk/s/?ie=UTF8&keywords=ipega+controller&tag=mh0a9-21&index=aps&hvadid=3170930385&ref=pd_sl_8cqpt3usal_ee, Sep. 17, 2014, 4 Pages.
"Razer Junglecat", Retrieved From: http://web.archive.org/web/20140606154907/http://www.razerzone.com/gaming-controllers/razer-junglecat, Sep. 17, 2014, 6 Pages.
"Samsung Smartphone GamePad", Retrieved From: https://web.archive.org/web/20140329010249/http://www.samsung.com/uk/consumer/mobile-devices/smartphones/smartphone-accessories/EI-GP20HNBEGWW, Aug. 31, 2017, 6 Pages.
"SMACON", Retrieved From: https://web.archive.org/web/20130308105750/http://www.sma-con.com/en/, Aug. 31, 2017, 2 Pages.
"Steelseries Stratus Wireless Gaming Controller", Retrieved From: https://web.archive.org/web/20140804125540/http://steelseries.com/us/products/controllers/steelseries-stratus-wireless-gaming-controller, Aug. 31, 2017, 7 Pages.
Yu, et al., "Clip-on Gadgets: Expanding Multi-touch Interaction Area with Unpowered Tactile Controls", In Proceedings of the 24th annual ACM symposium on User interface software and technology, Oct. 16, 2011, 5 Pages.
"Second Office Action and Search Report Issued in Chinese Patent Application No. 201480005350.5", dated Jul. 24, 2018, 14 Pages.
Ayeleasebee, "iFrogz to unveil $70 Caliber Advantage mobile gaming controller; Belkin to display new $80 and $50 iPad keyboard cases", Retrieved From: https://9to5mac.com/2013/01/08/ifrogz-to-unveil-70-caliber-advantage-mobile-gaming-controller-belkin-to-display-new-80-and-50-ipad-keyboard-cases/, Jan. 8, 2013, 2 Pages.
Davidson, Andrew, "XOPAD Open Source Android USB Controller gets into the Game", Retrieved From: https://web.archive.org/web/20151010111357/http://www.gizmag.com/xopad-open-source-usb-game-controller-android/26095/, Feb. 5, 2013, 6 Pages.
"Bluetooth Mobile Controller", Retrieved From: https://translate.google.co.in/translate?hl=en&sl=sv&u=https://gametel.se/&prev=search, Aug. 30, 2012, 7 Pages.
Hwang, et al., "MagGetz: Customizable Passive Tangible Controllers On and Around Conventional Mobile Devices", In Proceedings of the 26th Annual ACM symposium on User interface software and technology, Oct. 8, 2013, pp. 411-416.

(56) References Cited

OTHER PUBLICATIONS

Lee, Cody, "Wikipad introduces new Gamevice controller for iPad mini", Retrieved From: http://www.idownloadblog.com/2014/06/18/wikipad-gamevice-ipad-mini/, Jun. 18, 2014, 4 Pages.

Lefebvre, Rob, "First Two iOS 7 Game Controllers Teased by Logitech, ClamCase", Retrieved From: https://web.archive.org/save/_embed/https://www.cultofmac.com/246399/first-two-ios-7-game-controllers-teased-by-logitech-clamcase/, Sep. 19, 2013, 4 Pages.

Liang, et al., "GaussBricks: Magnetic Building Blocks for Constructive Tangible Interactions on Portable Displays", In Proceedings of the SIGCHI Conference on Human Factors in Computing Systems, Apr. 26, 2014, 9 Pages.

Reid, Ben, "This Gaming Controller for the iPad mini, Nexus 7 Looks Stunning [Video]", Retrieved From: http://www.redmondpie.com/game-d-controller-for-ipad-mini-and-nexus-7-video/, Apr. 12, 2013, 6 Pages.

Thukral, Hitesh, "WikiPad first glasses-free 3D Android tablet with attachable game controller", Retrieved From: http://techwrldinfo.blogspot.in/2012/01/wikipad-first-glasses-free-3d-android.html, Sep. 10, 2014, 4 Pages.

Tyson, Mark, "GameKlip Clips a PS3 Controller to your Android Phone", Retrieved From: http://hexus.net/gaming/news/android/43409-gameklip-clips-ps3-controller-android-phone/, Aug. 7, 2012, 3 Pages.

"Office Action Issued in European Patent Application No. 14708124.4," dated May 2, 2018, 7 Pages.

"Non Final Office Action Issued in U.S. Appl. No. 14/513,051", dated Jan. 2, 2019, 6 pages.

"Third Office Action Issued in Chinese Patent Application No. 201480005350.5", dated Feb. 19, 2019, 06 Pages.

Orland, Kyle, "Wikipad Adds Detachable Button Controls to a 10.1? Android 4.1 Tablet", Retrieved from: https://arstechnica.com/gaming/2012/09/wikipad-adds-detachable-button-controls-to-a-10-1-android-4-1-tablet/, Sep. 7, 2012, 4 Pages.

"Final Office Action Issued in U.S. Appl. No. 14/513,051", dated Jul. 11, 2019, 8 Pages.

\* cited by examiner

RECONFIGURABLE CLIP-ON MODULES FOR MOBILE COMPUTING DEVICES

RELATED APPLICATIONS

This application is a continuation from U.S. patent application Ser. No. 14/513,051, filed Oct. 13, 2014, which is a divisional from U.S. patent application Ser. No. 13/745,658, filed on Jan. 18, 2013, now U.S. Pat. No. 8,858,335, and entitled "RECONFIGURABLE CLIP-ON MODULES FOR MOBILE COMPUTING DEVICES.", the entire contents of each of which are hereby incorporated herein by reference for all purposes.

BACKGROUND

There are large numbers of computing devices that have touch-sensitive screens which allow users to interact using touch gestures directly on the device's screen. Examples include smartphones, tablet computers, large interactive surface computers and touch-sensitive displays for desktop computers. Although for some applications, this interface provides an adequate user input mechanism, for some applications and for some users (e.g. users with a visual impairment), the flat, continuous interaction surface (the device screen) can be difficult to use as there are no physical boundaries or tactile feedback to help guide and keep the user's fingers in the correct place. In addition, since the device's screen is used both as an input device and a display device (i.e. as an output device), the user's fingers may obscure areas of the screen whilst interacting with an application.

The embodiments described below are not limited to implementations which solve any or all of the disadvantages of known user input devices.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

A set of reconfigurable clip-on modules for mobile computing devices includes two or more modules and at least one of the modules has an input button or other control and at least one of the modules can communicate with the computing device without needing to be connected to it via a wire. The input button is mapped to a user input in a program, such as a game, which is running or displayed on the computing device to which the modules are clipped. In an embodiment, user inputs via the buttons or other controls on the clip-on modules are mapped to user inputs in a game running on the device, which may be a touch-screen device, and the mapping between user inputs via the buttons and user inputs in the game may change dependent upon the game being played, user preference, or other criteria.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

There are many computing devices which comprise a flat, continuous interaction surface (the device screen), including smartphones, tablets (which may also be referred to as slates), surface computing devices and touch-sensitive displays for desktop computers. As described above, the lack of physical reference points or tactile feedback provided by the touch-sensitive screen (unlike with physical buttons) can cause problems for some applications (e.g. games) and for some users (e.g. those with a visual impairment). It is easy for a user's fingers to move when playing a game so that the fingers are no longer aligned with the game's input controls and this is exacerbated where the game requires rapid or frequent input. Additionally, when in position, the user's fingers may obscure areas of the screen and this may impact usability, particularly for smaller form factor devices (e.g. smartphones).

Figure 1:
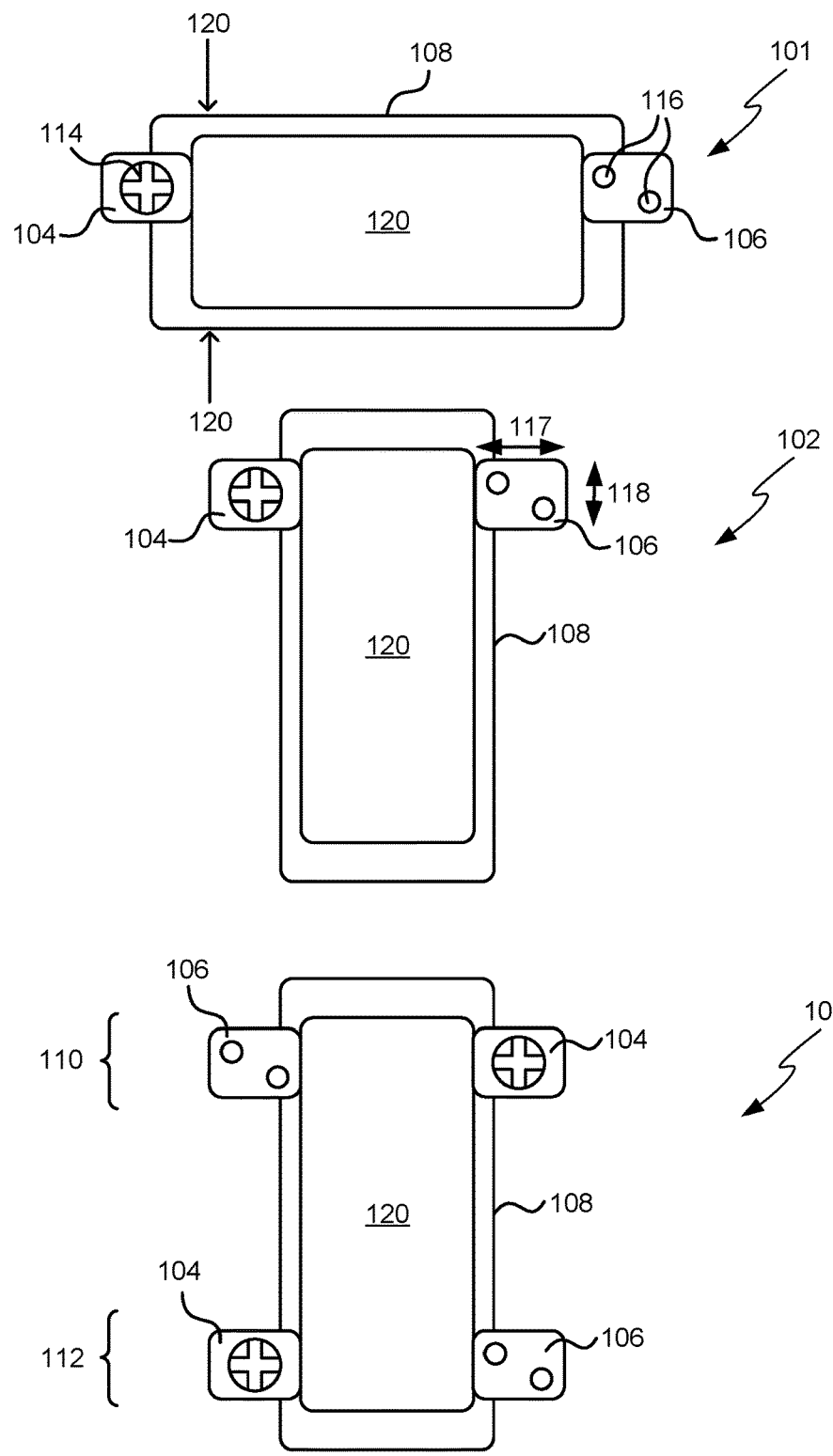
FIG. 1 shows three schematic diagrams of sets of reconfigurable input/output modules attached around the periphery of a touch-screen device.

FIG. 1 shows three schematic diagrams 101-103 in which reconfigurable input/output modules 104, 106 are attached around the periphery of a touch-screen device 108 (i.e. around the edge of the display), which may, for example, be a portable or handheld device such as a tablet (of any size) or smartphone or a fixed touch-screen device (e.g. on an appliance or in a vehicle). In the first diagram 101, the touch-screen device 108 is oriented in landscape and one input/output module 104, 106 is attached on each of the short sides of the device (i.e. on the short sides of the face of the device which includes the display). In the second diagram 102, the touch-screen device 108 is in portrait orientation and the input/output modules 104, 106 are attached on the long sides of the device. In the third diagram 103, there are four input/output modules 104, 106 which are arranged at each end of the touch-screen device 108 and which may provide a pair of input/output modules 110 for use by a first user and a pair of input/output modules 112 for use by a second user, for example when playing a two player game on the touch-screen device 108. Alternatively, the four input/output modules in the third diagram 103 may be used by a single user.

As shown by the three examples in FIG. 1, the input/output modules 104, 106 can be placed anywhere around the periphery of the touch-screen device 108 and may be rearranged by a user depending on the application displayed/running on the device, personal preference, or any other factor. Consequently, the modules may be described as reconfigurable (e.g. a user can choose where to place the modules and can move them if they wish). It will be appreciated that in some examples there may be positions where a module cannot be placed (e.g. over a camera or power button, although in many instances a module may be placed over either or both of these), but a user still has the ability to position the modules freely on the remaining periphery of the touch-screen device. Furthermore, although the examples in FIG. 1 show use of two and four modules, in other examples, a set of modules may comprise N modules, where N is an integer and N≥2.

At least one of the input/output modules 104, 106 comprises an input control and in the examples shown, all the input/modules comprise an input control (e.g. four-way control 114 or buttons 116). In various examples, the input control is a tactile input control, such as a physical control (e.g. one with a contoured profile which may move when pressure is applied by a user) which provides tactile feedback to a user that their finger/thumb is correctly positioned on the control. In other examples, the input control may not be tactile and instead may comprise an optical sensor, capacitive sensor or other sensor. In further examples, a combination of tactile and non-tactile input controls may be provided. It will be appreciated that the examples shown in FIG. 1 (a four-way control and a pair of buttons) are just examples of the input controls that may be provided on an input/output module. Further examples include, but are not limited to, a rotary knob, a slider, a single button (or different number of buttons), a switch and a small joystick. Examples of sensors which may be used include, but are not limited to, a hover sensor for hand position (e.g. based on reflecting IR or seeing IR shadows or thermal IR sensing or based on ultrasound), a magnetometer for sensing distortions due to rings worn on hands, or any other type of sensor that can detect a characteristic of the human or of something the human is wearing. If the device (e.g. the touch-screen device or the module) is flexible or articulatable, then the sensors may detect how the user flexes or articulates the device, e.g. using accelerometer.

Each input control 114, 116 is mapped to a user input of an application or other program (e.g. the operating system or any other software) displayed/running on the touch-screen device 108. The user inputs to which an input control 114, 116 is mapped may be a touch-event (i.e. a user input that a user would usually provide by touching the touch-sensitive display) or may be an input via a physical button or control on the touch-screen device 108 or any input via a supported peripheral (e.g. a Bluetooth keyboard) or any other supported hardware (where the hardware need not be present but only be supported by the program receiving the user input). In some examples, the user inputs may be keystrokes such that the input/output modules may be used instead of an onscreen keyboard.

Where there are multiple input controls, as in the examples shown in FIG. 1, each input control may be mapped to a different user input of the same application/program or the input controls may be mapped to user inputs of two or more applications/programs. In an example, both the four-way control 114 and buttons 116 may be mapped to user inputs of a game which is displayed or running on the touch-screen device. In another example, the four-way control 114 may be mapped to a user input of a game running on the touch-screen device 108 (or a cloud-based game which is displayed on the touch-screen device) and the buttons 116 may be mapped to functions within the operating system (OS) of the device, such as volume controls. In a further example, the four-way control 114 may be mapped to a user input of an application displayed/running on the touch-screen device 108 and one of the buttons may be mapped to a particular input in another application (e.g. an 'answer' button in an IP telephony application). The mapping may be fixed, dynamic or a combination of both fixed and dynamic (e.g. with a first subset of controls having a fixed mapping and a second subset of controls being dynamically mapped, where each subset does not comprise all of the controls). There may be a number of factors which influence the mapping and these may include the position of an input/output module, the relative position of more than one input/output module, the particular application (or other program) which is visible on the screen (or uppermost, where multiple applications are visible), user input, etc. The mapping of controls to inputs is described in more detail below.

In the examples shown in FIG. 1, the input control is on the front face of a module (i.e. on the face which is substantially parallel to the touch-screen display in use or when the module is attached to the device). Alternatively, an input control may be provided on another face of the module or a corner of the module in addition to, or instead of, an input control on the front face (e.g. to provide finger trigger buttons on a top side of a module and/or tactile controls on a rear surface of the display). For example, an input control may be provided on both the front and rear faces.

In various examples, one or more of the modules may comprise an output device such as a visual indicator (e.g. a small display or one or more LEDs), audible indicator (e.g. a small speaker or buzzer or headphone socket), tactile (or haptic) feedback device (e.g. a vibration mechanism, any physical movement actuator or a movement retarder if the touch-screen device or module is flexible or articulatable) or other sensory feedback device (e.g. a heating/cooling device, such as a Peltier cooler, which can provide feedback by changing the temperature of a module or chemical outputs for smells, hormones, etc). In various examples, a module may comprise both an input device (e.g. a tactile control) and an output device (e.g. an indicator LED).

When positioned around the periphery of a touch-screen device 108 (and physically attached to the touch-screen device), the input/output modules 104, 106 obscure little or none of the actual display area 120 and in the examples shown in FIG. 1, the modules 104, 106 do not obscure any of the actual display area 120. This means that there is more real estate on the screen for viewing and increases ease of use. Although the modules are described herein as being attached around the periphery of the device, in other examples the modules may be attached in other places, i.e. to other non-display portions of the touch-screen device, such as the rear face of the device.

Figure 9:
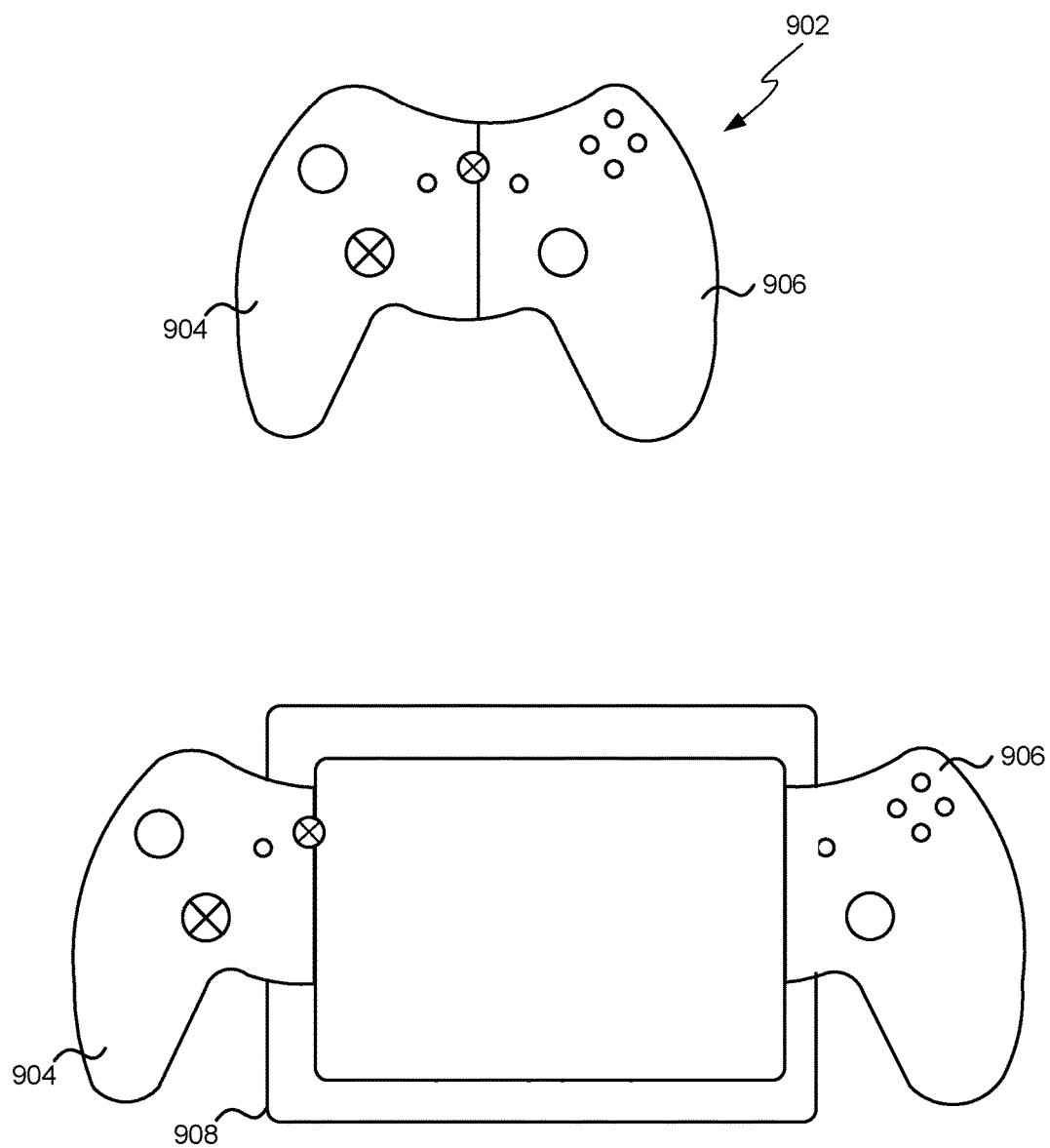
FIG. 9 shows a schematic diagram of a games controller which comprises two halves each of which is operable as an input/output module.

It will be appreciated that FIG. 1 is not necessarily drawn to scale, however, in various examples the modules are compact and have dimensions (e.g. the length of a side of the front face, as indicated by arrows 117, 118) which are considerably smaller than the touch-screen device 108 to which they attach. For example, the front face of the modules may be approximately 1 inch (2.54 cm) square and used with touch-screen displays ranging from around 3 inches (~7.5 cm) to 10 inches (~25 cm) or more (where the screen size is measured on the diagonal). In other examples, however, the modules may not be considerably smaller than the touch-screen device to which they attach (e.g. as shown in FIG. 9 and described below). Although FIG. 1 shows all the modules being approximately the same shape and size, in some examples, the modules within a set may be of different sizes and/or shapes.

Figure 2:
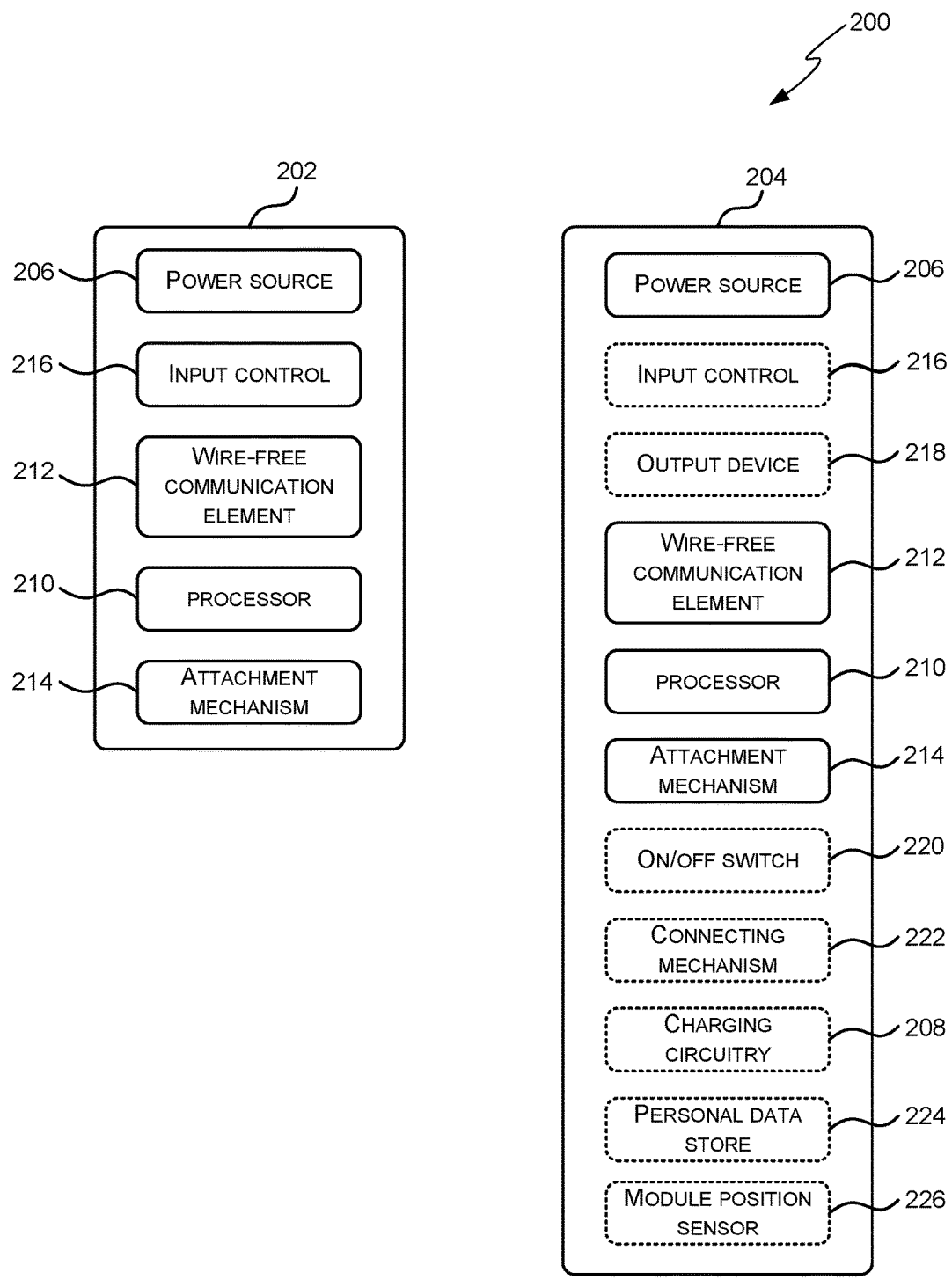
FIG. 2 shows a schematic diagram of an example set of input/output modules, such as those shown in FIG. 1.

FIG. 2 shows a schematic diagram of an example set of input/output modules 200, such as those shown in FIG. 1. The set of input/output modules 200 shown in FIG. 2 comprises two modules 202, 204 although other example sets may comprise more than two modules. Each module comprises a power source 206, which may, for example, be a battery or super capacitor. Super capacitors have an extremely short charge time compared to batteries (e.g. a 10 second charge may be sufficient to power the module for about an hour of normal use) which makes them particularly suited to this application. Where super capacitors or rechargeable batteries are used, the module may further comprise charging circuitry 208. The charging circuitry may take power from a mains electricity supply or may draw power from the touch-screen device (e.g. via a USB or proprietary connector on the device or using a wireless charging mechanism).

Each module 202, 204 also comprises a processor 210 (such as a microcontroller, microprocessor or any other suitable type of processor for processing computer executable instructions) which controls the operation of the module, a wire-free communication element 212 and a physical attachment mechanism 214 which is used to attach the module to a touch-screen device (e.g. at different positions around the periphery of the device). Many different attachment technologies may be used and various examples are described below with reference to FIG. 3. Although the module is shown comprising a processor 210, it will be appreciated that in some examples, for example where a system on a chip architecture is used, the processor 210 may include one or more fixed function blocks (also referred to as accelerators) which implement a part of the method of operation of the module in hardware (rather than software or firmware). Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs).

The computer executable instructions (which are executed by the processor 210) may be provided using any computer-readable media that is accessible by the module. Computer-readable media may include, for example, computer storage media such as memory and communications media. Computer storage media, such as memory, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. The computer storage media (e.g. memory) may be within the module or the storage may be distributed or located remotely and accessed via a network or other communication link.

The wire-free communication element 212 is arranged to communicate with the touch-screen device and/or with other modules within the set 200. In particular, signals that represent the user inputs received at the module (via an input control 216) are communicated to the touch-screen device via the wire-free communication element 212. Where the module comprises an output device 218, signals may also be communicated from the touch-screen device to the module via the wire-free communication element 212 and used to control an output device 218.

At least one of the modules in the set 200 comprises a wire-free communication element 212 that is arranged to communicate with the touch-screen device and where a module comprises a wire-free communication element 212 that is not arranged to communicate with the touch-screen device, the element 212 may be arranged to communicate with another module in the set which may act as a gateway/relay for communications with the touch-screen device. In various examples, all of the modules in the set 200 may communicate directly with the touch-screen device rather than passing messages via one of the modules that acts as a gateway to the touch-screen device for all the modules in the set. Alternatively, one of the modules in the set 200 may act as a relay for the other modules in the set such that only the relay has a wire-free communication element 212 arranged to communicate with the touch-screen device and the remaining modules in the set comprise a wire-free communication element 212 that is arranged to communicate with the module that acts as a relay. In this way the non-relay modules act as slaves to the master module which acts as relay and communicates with the touch-screen device and this reduces overall power consumption.

Any suitable wire-free communication protocol or mechanism may be used and examples include:
- audio (e.g. 900 Hz tones of different lengths, AFSK or DTMF),
- Bluetooth® (e.g. BLE or Bluetooth® Smart),
- NFC,
- other low energy radio protocols (e.g. ZigBee, ANT or Peanut),
- magnetic field based techniques,
- capacitive signaling using the touch-screen sensor
- optical or infra-red techniques (e.g. using an LED on the module to communicate with a camera or proximity sensor on the touch-screen device), and
- vibration based techniques (e.g. which communicate with an accelerometer in the touch-screen device).

The term 'wire-free' is used herein to refer to any technology which does not rely on a direct electrical connection along electrical conductors (i.e. wires) between the module and the touch-screen device. The term 'wire-free' therefore encompasses all wireless (e.g. RF) technologies in addition to other technologies which do not rely on wires, such as other wave-based technologies (e.g. optical technologies, sound and use of vibrations).

In an example, each module may communicate directly with the touch-screen device using low energy Bluetooth® (e.g. BLE or Bluetooth® Smart) as most touch-screen devices have integrated Bluetooth® capabilities. Alternatively, where a proprietary or less common protocol is used by the wire-free communication element 212 and the touch-screen device is not equipped to receive such a protocol, a module may communicate (using the wire-free communication element 212) with the touch-screen device via a communications module which may be connected to the touch-screen device using a wired connector (e.g. a mini or micro USB connector or proprietary connector). This communications module receives the unfamiliar protocol and converts the signals into a protocol that is recognized by the touch-screen device.

In another example, the wire-free communication element 212 may use sound to communicate with the touch-screen device. In an example implementation, the wire-free communication element 212 may comprise a small loudspeaker or buzzer which emits short audible beeps (e.g. at 900 Hz) when a user presses an input control on the module or alternatively a tone may be generated mechanically. Within a set of modules, different input controls (or different movement of the same input control) may cause beeps of different durations. These beeps can be captured and decoded by the touch-screen device (e.g. via the touch-screen device's microphone) and then input into an application or the OS running on the device to simulate the user's tapping of onscreen controls. Alternatively, different frequency tones may be used (e.g. as in DTMF signaling or AFSK).

In some examples, the set of input/output modules may further comprise an input/output module which does not comprise a wire-free communication module but is instead connected to another input/output module via a wired connection.

As described above, at least one of the input/output modules in the set 200 comprises an input control 216. As described above, this input control 216 may be tactile (e.g. a raised button or other control) and may provide tactile feedback to the user when pressure is applied (e.g. the control may tilt or otherwise move). Alternatively, the input control 216 may be a capacitive, optical or other sensor and not provide any tactile feedback. In some examples, an input/output module may be arranged such that the input control 216 is removable such that a module can be reconfigured by removing one input control (e.g. a four-way switch) and replacing it with a different input control (e.g. a single button).

Optionally the input control 216 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

A module may also comprise one or more additional elements, for example an output device 218 (as described above), an on/off switch 220, a connecting mechanism 222 and/or a personal data store 224. The connecting mechanism 222 may be arranged to physically connect the modules in a set together (e.g. for ease of storage and/or to reduce the risk of a module getting lost) and may, in some examples, also provide an electrical connection between modules such that the power sources 206 with the modules can be charged whilst they are connected together and requiring attachment of a single charging lead. In some examples, the attachment mechanism 214 may be arranged to also act as a connecting mechanism 222.

The personal data store 224 may, for example, be used to store login details or credentials associated with an application or other program (e.g. a user's gaming login details) and/or other personal details associated with an application or other program (e.g. a user's skill level, highest score or profile) and/or configuration preferences for the input/output modules. In other examples, the personal data store 224 may be used to store authentication or security information (e.g. a user's private key or credentials). Data from the personal data store 224 may be communicated to the touch-screen device via the wire-free communication element 212 and may, for example, be used in configuring the input/output modules (e.g. when mapping inputs to touch events) and/or in configuring an application running on the touch-screen device. In an example, if a user stores their gaming login details on their modules (in the personal data store 224), they may be automatically logged into a game when they attach the input/output modules to a touch-screen device on which the game is installed. They may also remain authenticated with the game until the modules are detached from the touch-screen device. In another example, login details stored in the personal data store 224 may be used to access user preferences from a remote (e.g. cloud-based) store instead of storing user preferences in the personal data store.

Figure 3:
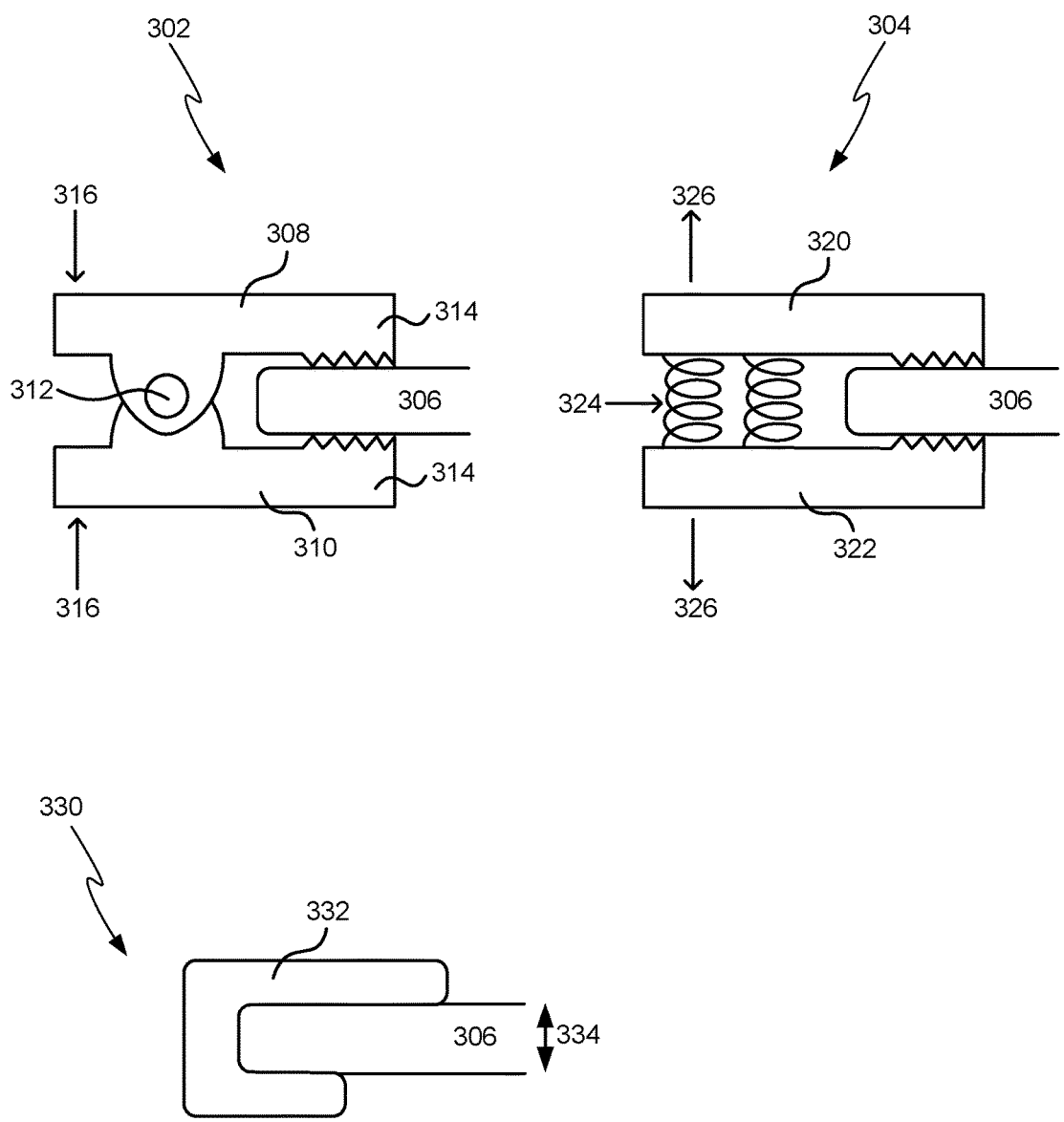
FIG. 3 shows schematic diagrams of various different attachment mechanisms.

FIG. 3 shows schematic diagrams of various different attachment mechanisms which may be used to enable the modules to be physically attached anywhere around the periphery of a touch-screen device. All the examples shown in FIG. 3 use a clamp mechanism (or arrangement) as the attachment mechanism grips the edge of the touch-screen device in some way (e.g. by contacting two opposing parallel faces of the device). When gripping the touch-screen device, the inner faces of the modules that are in contact with the touch-screen device may be shaped (or structured) to prevent the module from slipping off the device (e.g. in a complementary manner to any structure on the touch-screen device itself) and/or non-slip surfaces may be provided on the inner faces. As described above, any suitable mechanism may be used including, but not limited to, clamp mechanisms, sprung mechanisms (i.e. mechanisms which involve some form of spring or deformation of material), magnets, friction-fit (or push-fit) mechanisms and mechanisms using suction or adhesion (whether temporary or permanent), where any module may use one or more of these mechanisms. Depending on the mechanism used, a module may fix to the touch-screen device by contacting at least two faces of the touch-screen device (as in FIG. 3) or by fixation to a single face (e.g. fixation solely on the back of the touch-screen device).

The first two examples 302, 304 in FIG. 3 show sprung mechanisms such that the front and back portions of the module clamp onto the touch-screen device 306. This means that the module is unlikely to slip or move once positioned by a user and also the module can accommodate different thicknesses of touch-screen device (e.g. both a smartphone and a tablet).

In the first example 302, the front portion 308 and back portion 310 of the module are connected by a pivot joint 312 and the mechanism is sprung, like a bull-dog clip or clothes peg, such that in the absence of a device 306 the jaws of the module 314 are forced together (i.e. the natural position of the module is with the jaws closed). By applying a pinching force on the other side of the joint 312 from the jaws (e.g. in the positions indicated by arrows 316) a user can force the jaws apart so that the module can be clipped onto the touch-screen device 306.

In the second example 304, the module comprises a front plate 320 and a back plate 322 which are connected by springs 324 which pull the plates together. In order to clip the module onto a touch-screen device 306 (or other object), a user pulls the plates apart (e.g. as indicated by arrows 326) and fits the module around the edge of the touch-screen device 306 before releasing the plates. Whilst this example may be more compact than the first example, particularly when the modules are not clipped to a touch-screen device (as the natural position of the module is with the two plates in contact with each other), the pivot mechanism of the first example makes it easier to attach the module to the touch-screen device.

In the third example 330, the module 332 is formed such that it is a push-fit around the touch-screen device 306. This means that the module 332 is designed for a particular thickness of touch-screen device (where the thickness is indicated by arrow 334) and different module designs may be produced to fit different thicknesses of touch-screen device. Alternatively, magnets may be included within the module 332 so that the module attaches to the touch-screen device 306 even in situations where the module does not correspond exactly to the thickness of the touch-screen device (i.e. so that the module does not need to be a push-fit).

Although the examples shown in FIG. 3 clamp to the front and back faces of the touch-screen device, in other examples, the modules may clamp (or otherwise attach) to the top and bottom of the touch-screen device (e.g. at positions marked 120 in the first diagram 101 in FIG. 1).

In some examples, the attachment mechanism 214 may be interchangeable so that for example in the third example 330 of FIG. 3, a module can be adapted to attach to different form factor devices without having to replace the entire module (e.g. without replacing the electronics within the module).

As described above, a module may comprise an on/off switch 220. Alternatively, a module may comprise a sensor which is arranged to detect whether the module is attached to a touch-screen device (or to anything else) or not and which is further arranged to switch the module on automatically when it is attached to something (or only when it is attached to the touch-screen device). Where such a sensor is used, this sensor may be integrated within the attachment mechanism 214 (e.g. within the spring clip arrangement of the first example 302 of FIG. 3) or may be provided separately (e.g. an optical sensor on the face which is in contact with the front face of the touch-screen device and which detects whether the touch-screen is switched on). In addition, or instead, this sensor may be used for other purposes, for example, the sensor may be used to trigger an action (e.g. sending an identifier or calibration signal to the touch-screen device) when the module is attached to a touch-screen device. In some examples, a module may comprise both a sensor and an on/off switch.

As described above, the input controls on the modules are mapped to a user input of an application, the OS or other program displayed/running on the touch-screen device. This mapping may be static (e.g. set up initially and then remains the same) or dynamic (e.g. it may depend on which application is active on the touch-screen device or may change during operation of the application). In an example, the mapping of the input controls to user inputs may change dependent upon which program a user is interacting with on the touch-screen device at any time, such that where a user switches between applications (e.g. between a game and a calendar application) the mapping changes. In another example, the mapping may change dependent upon the location (or relative location) of the modules when attached to the touch-screen device. In other examples, a combination of any of the methods described herein may be used.

In examples where the mapping is dependent upon the position or relative position of the input/output modules, the position or relative position of modules may be detected by the touch-screen device or by the modules themselves. In a first example, one or more of the modules may comprise a module position sensor 226 which is arranged to detect either the position of the module itself (e.g. the position of module 204 in FIG. 2) or the position of one or more other modules in the set (e.g. the position of module 202 in FIG. 2). Where the position of another module is detected, characteristics of the separation of the two modules (e.g. distance between them) may be detected. Any suitable sensing technology may be used (e.g. visible light or IR) and in some examples, the wire-free communication element 212 may also be used as a module position sensor. In an example, one or more modules may comprise a module position sensor 226 which is a photodetector and may be arranged to detect visible light/IR emitted by an output device 218 (or other element) on another module and use the characteristics of the detected signal to determine the relative locations of the modules. For example, if a module comprises multiple photodetectors on different faces of the module, the relative position of other modules may be determined based on which photodetectors detect light/IR emitted by another module. Where the modules themselves detect their position or relative position, this information may be communicated to the touch-screen device via the wire-free communication element 212.

In other examples, the position of input/output modules may be detected by the touch-screen device itself. For example, a module may have a code or marker on an inner face which is in contact with the screen of the touch-screen device and which may be read by the touch-screen device, even if the module is positioned outside of the display area (e.g. as the touch-sensitive area may extend beyond the area used for display). In another example, the input/output module may comprise an output device 218 (e.g. an LED or other active indicator) on the inner face to enable it to provide an identifier or other signal to the touch-screen device (e.g. again as detected by the touch-sensitive display). In various examples, an input/output module may have a unique ID or a type identifier (e.g. 4-way control, 2 buttons, etc) which is communicated to the touch-screen device using a code, marker, active indicator or other means (e.g. via the wire-free communication element 212) and this identifier may be used in the mapping.

In some examples, a target program (e.g. a game) may suggest positions for the input/output modules to the user (e.g. a program may advise the user where they consider the optimum position of modules to be). This information may be provided to the user as part of the program loading screens or other on-screen hints.

User inputs via the input controls on the input/output modules are mapped to user inputs in programs displayed/running on the touch-screen device, e.g. applications (such as games) or the OS, and the program with the user inputs that are the target of the mapping may be referred to as the 'target program'. This mapping may be performed automatically or there may be user involvement in the mapping. Where there is data communicated from the modules to the touch-screen device (e.g. identifiers, position information, data from the personal data store 224, etc) this information may be used when performing the mapping. Similarly, where the touch-screen device can determine information about the modules (e.g. their position or characteristics of the modules, such as what input control they include), this may also be used when performing the mapping.

The mapping itself may be performed by the target program itself or by another program running on the touch-screen device or by a program running remotely from the touch-screen device and various examples are described below with reference to FIGS. 4 and 5. Where the input/output modules communicate with the touch-screen device using Bluetooth®, any supported profile may be used, such as the Bluetooth® HID (Human Interface Device) profile which provides support for keyboards, joysticks and mice. Alternatively A2DP or HSP may be used instead of HID. If a different communication technology is used to communicate between the modules and the touch-screen device (e.g. Wireless USB), an appropriate supported profile may be used.

Figure 4:
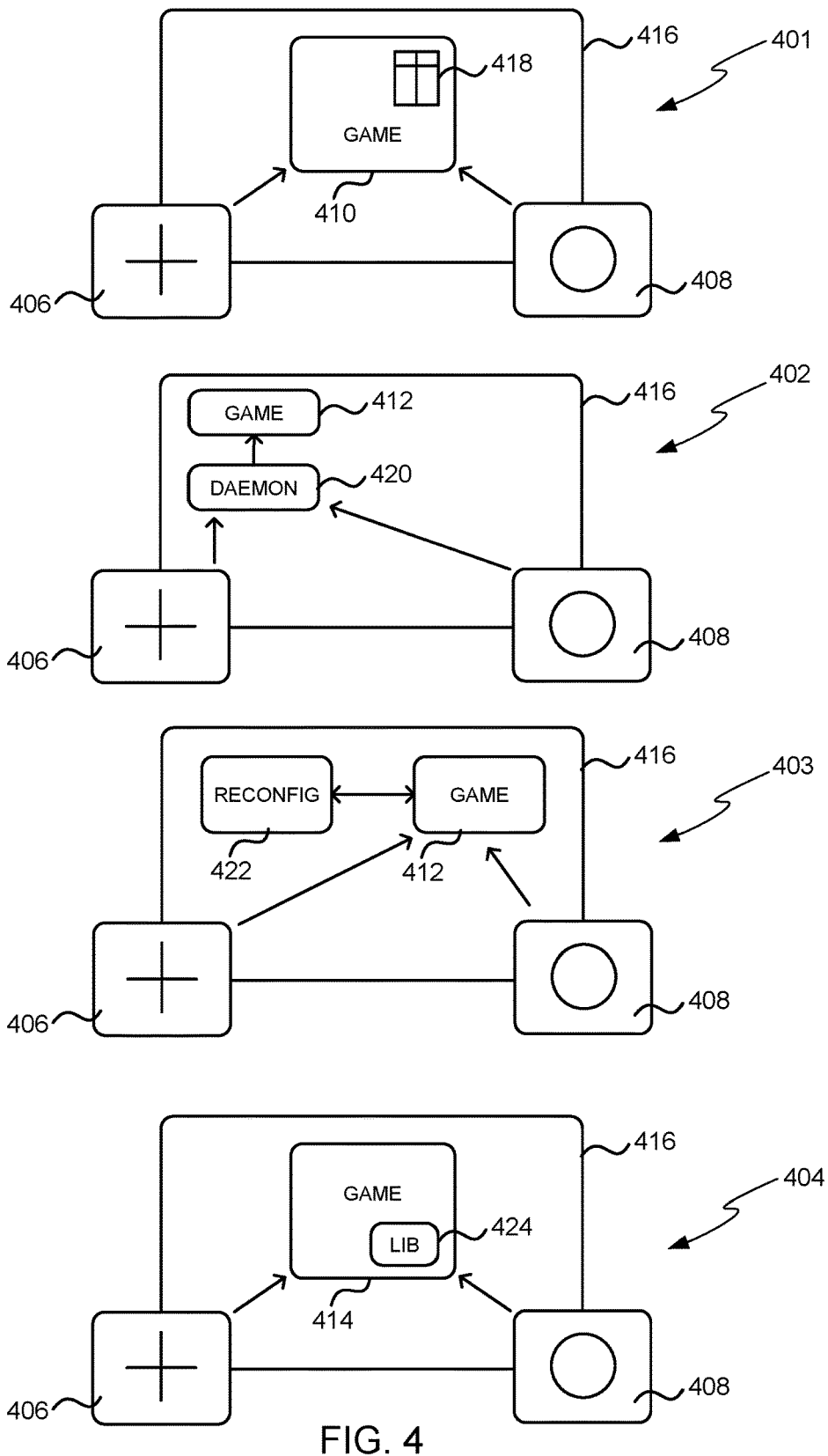
FIG. 4 shows schematic diagrams of four example methods of mapping inputs on an input/output module to a user input in a target program.

FIG. 4 shows schematic diagrams 401-404 of four example methods of mapping inputs on an input/output module 406, 408 to a user input in a game 410-414. It will be appreciated that a game is used as an example of a program which may run on a touch-screen device 416 and other examples of programs include the OS or other applications.

In the first example 401, the user input signals from the input/output modules 406, 408 are received by the game 410, e.g. using the Bluetooth® HID (or other HID), and the mapping of the user input signals to user inputs recognized by the game is performed by the game itself. In this example, the game 410 comprises a mapping table 418 which stores the mappings between an input signal (e.g. an input keystroke) and the corresponding user input in the game 410.

In the second example 402, a daemon 420 running on the touch-screen device 416 receives the input signals from the input/output modules 406, 408 (e.g. using the Bluetooth® HID) and then provides signals to the game 412 which simulate a touch event. The game 412 does not need to be modified in any way because the user input signals it received from the daemon 420 are exactly the same as it would otherwise receive from the OS running on the touch-screen device when the user provides an input via the touch-screen. In this way, the daemon can simulate (or spoof) any touch event or in some examples may be configured to spoof other events (e.g. detected sounds).

In a variation of the second example 402, the daemon 420 may be part of the OS on the touch-screen device 416 and may provide a configuration screen for the input/output modules 406, 408 in a similar way to configuring a mouse via the control panel in an existing OS. Irrespective of whether the daemon 420 is separate from or integrated within the OS, the mapping between input signals and touch events may be fixed, user-configurable, dynamic (e.g. dependent upon the application being used by the user) or any combination thereof.

In some computing environments and/or with some games, it may not be possible to have a second program (e.g. daemon 420) running on the touch-screen device 416 and providing the user input signals to the game (as is shown in the second example 402). In such situations, an arrangement as shown in the third example 403 may be used. In this example, a reconfiguration application 422 running on the touch-screen device 416 sends reconfiguration commands to the input/output modules 406, 408 which are dependent upon the game 412 that is about to be played on the touch-screen device 416. These commands are received by the modules and change the input signals that are sent by the modules to the game in response to any user input received at the modules. A different reconfiguration application may be used for different games or alternatively, a single reconfiguration application may be configured to send reconfiguration commands for more than one game (or other program). In this way, the mapping is dynamic and dependent upon the game. Alternatively, the reconfiguration may be dependent upon the particular touch-screen device 416 and may be run as a one-off operation to configure the input/output modules 406, 408 to work with the particular device 416.

In comparing the first, second and third examples, in the first example 401, it is the game 410 that is reconfigured in some way (e.g. to map received input signals to different user inputs within the game) whereas in the second example 402, an intermediary (daemon 420) performs the translation between signals received from the modules and the signals expected by the game 412 and in the third example 403, the operation of the modules 406, 408 is modified so that they output the input signals that are expected by the game 412. In all these examples, the mapping may be performed automatically or there may be some user involvement, e.g. to run the reconfiguration application 422 or to specify a particular mapping (e.g. to configure the reconfiguration application 422 or daemon 420).

In the fourth example 404, the game 414 may be written with reconfigurable input/output modules in mind (i.e. the game may be considered to be aware of reconfigurable input/output modules). In the example shown the game 414 comprises a library 424 which comprises different sets of mappings between input signals from input/output modules 406, 408 and user inputs within the game 414. Depending on the input signals received from the modules by the game 414, the game may select an appropriate set of mappings from the library to use. In an example, the modules may send an identifier signal when switched on which is used by the game to identify the appropriate set of mappings to select from the library. Alternatively, a user may select an appropriate set of mappings based on user preference (e.g. whether they are left or right-handed). In this example, the input signals from the input/output modules are not mapped through an existing mechanism (e.g. as in example 401 where a left button may be mapped to 'keyboard left arrow' and this may then be mapped in the game to 'turn left') but instead, the game receives the input signal from the peripheral and maps it directly to the game command (e.g. 'turn left') without using an intermediate mapping.

Figure 5:
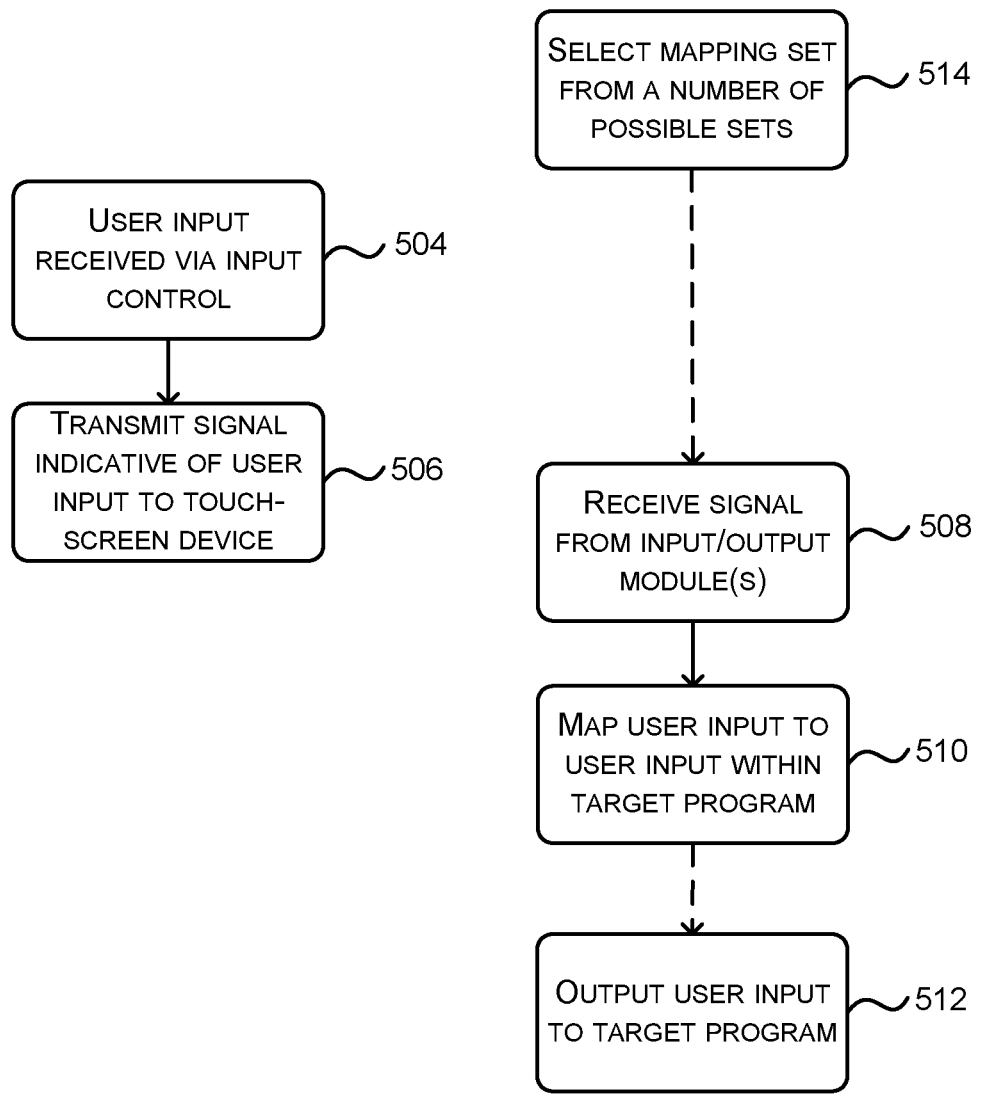
FIG. 5 shows a flow diagram of an example method of operation of the systems shown in FIGS. 4 and 7.
Figure 6:
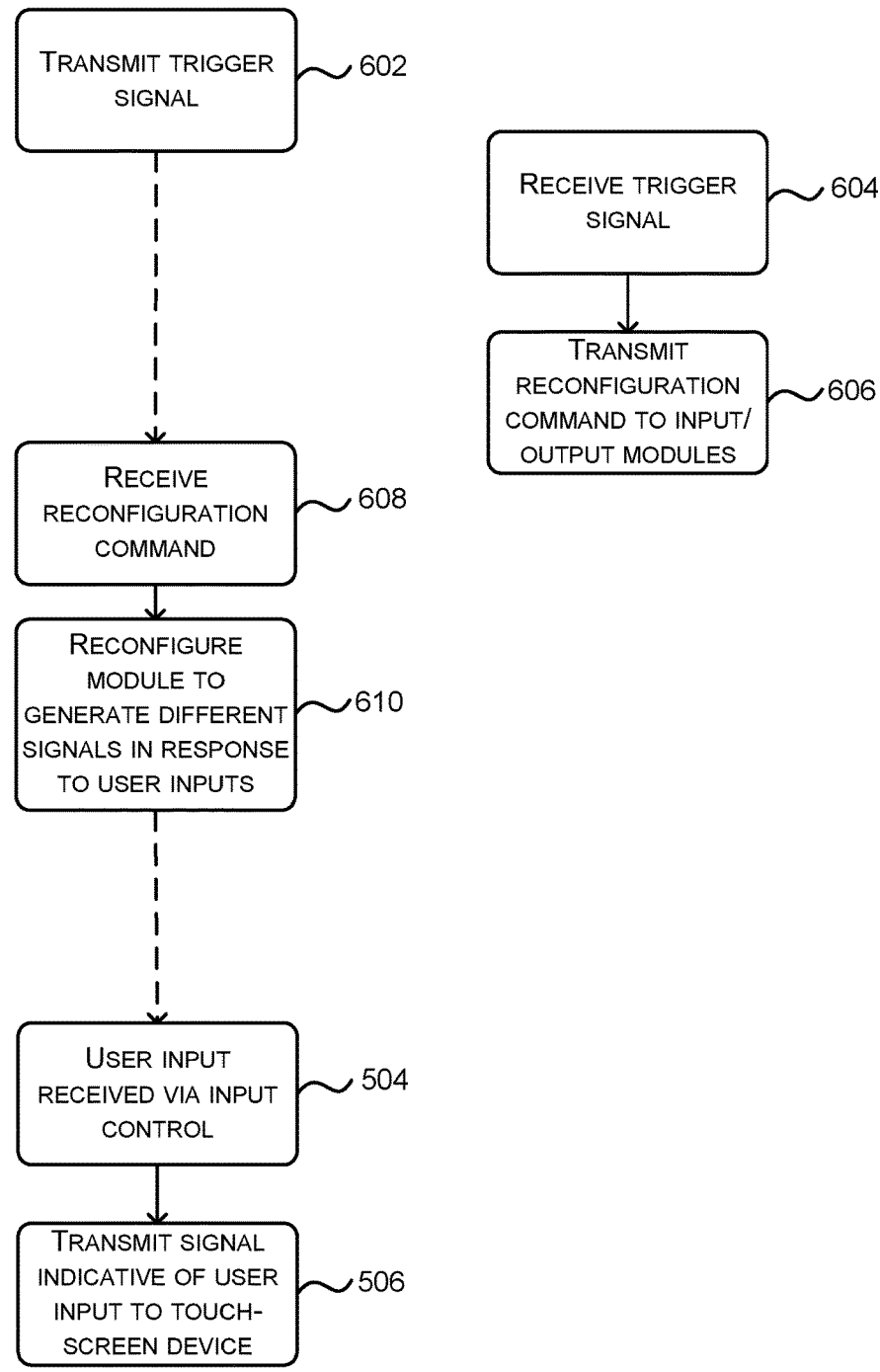
FIG. 6 shows a flow diagram of another example method of operation of the systems shown in FIGS. 4 and 7.

FIGS. 5 and 6 show flow diagrams for example methods of operation of the systems shown in FIG. 4. FIG. 5 corresponds to the first, second and fourth examples 401, 402, 404 in FIG. 4 although, as described below, block 512 may be omitted from the first and fourth examples and block 514 may be omitted from the first and second examples. FIG. 6 corresponds to the third example 403 in FIG. 4.

In FIG. 5 a user input is received on an input/output module (block 504), e.g. via an input control 216 as shown in FIG. 2. In response to this input, a signal is generated (e.g. by processor 210) and transmitted to the touch-screen device (block 506), e.g. using the wire-free communication element 212 in FIG. 2. This signal which is generated and transmitted (in block 506) is indicative of (or otherwise representative of) the particular user input that was received. For example, if the module comprises two input controls (e.g. two buttons as in module 106 in FIG. 1), a different signal is generated and transmitted if a user presses one button, compared to the user pressing the other button. These signals are then received by the touch-screen device (block 508) and these may be received by a program running on the device, where this program may be the target program (e.g. game 410 in the first example 401 in FIG. 4 or game 414 in the fourth example 404) or another program (e.g. daemon 420 in the second example 402). The receiving program then maps the received signal to a user input within the target program running on the touch-screen device (block 510), this user input within the target program may be referred to as the 'target user input'. Where the receiving program is not the target program (e.g. in example 402), a user input signal corresponding to the target user input is then output to the target program (block 512); however this step is omitted where the receiving program is the target program (e.g. in examples 401, 404). In some examples, (e.g. example 404), a mapping set may be selected from a number possible mapping sets (block 514) by the receiving program prior to performing the mapping (in block 510) and by selecting a different mapping set, a user input on an input/output module may be mapped to a different target user input. In an example, the different mapping sets (from which the selection is made in block 514) may correspond to different target programs.

In FIG. 6, a trigger signal is received on the touch-screen device (block 604) and these may be received by a reconfiguration application (e.g. reconfiguration application 422 in the third example 403 in FIG. 4). This trigger signal may have been sent by an input/output module (block 602) or may have been generated by another entity (e.g. by a program running on the touch-screen device which may, for example, be the target program). In response to receiving the trigger signal (in block 604), the reconfiguration application sends reconfiguration instructions to the input/output modules (block 606). It will be appreciated that different reconfiguration instructions may be sent to different input/output modules or the same instructions may be sent (e.g. broadcast) to all modules and the modules may determine which parts of those instructions need to be implemented by the receiving module. For example, referring to the module set shown in FIG. 4 which comprises a first module 406 with a four-way control and a second module 408 with a single button, different signals may be transmitted to each module or a signal may be transmitted which includes reconfiguration information for both a four-way control and a single button.

The reconfiguration instructions are received by the modules (block 608) and implemented (block 610). This implementation may change some or all of the signals which the input/output modules generate in response to user inputs. In some examples, implementation of the reconfiguration instructions (in block 610) may not cause any changes, e.g. where the reconfiguration instructions correspond to the current settings within the input/output modules. As described above, an input/output module may implement all the instructions contained in the reconfiguration signal or may implement a subset based on the particular input controls present on the module. When a user input is subsequently received at an input/output module (block 504), the signal which is generated (in block 506) is compliant with the reconfiguration instructions which were implemented (in block 610).

Figure 7:
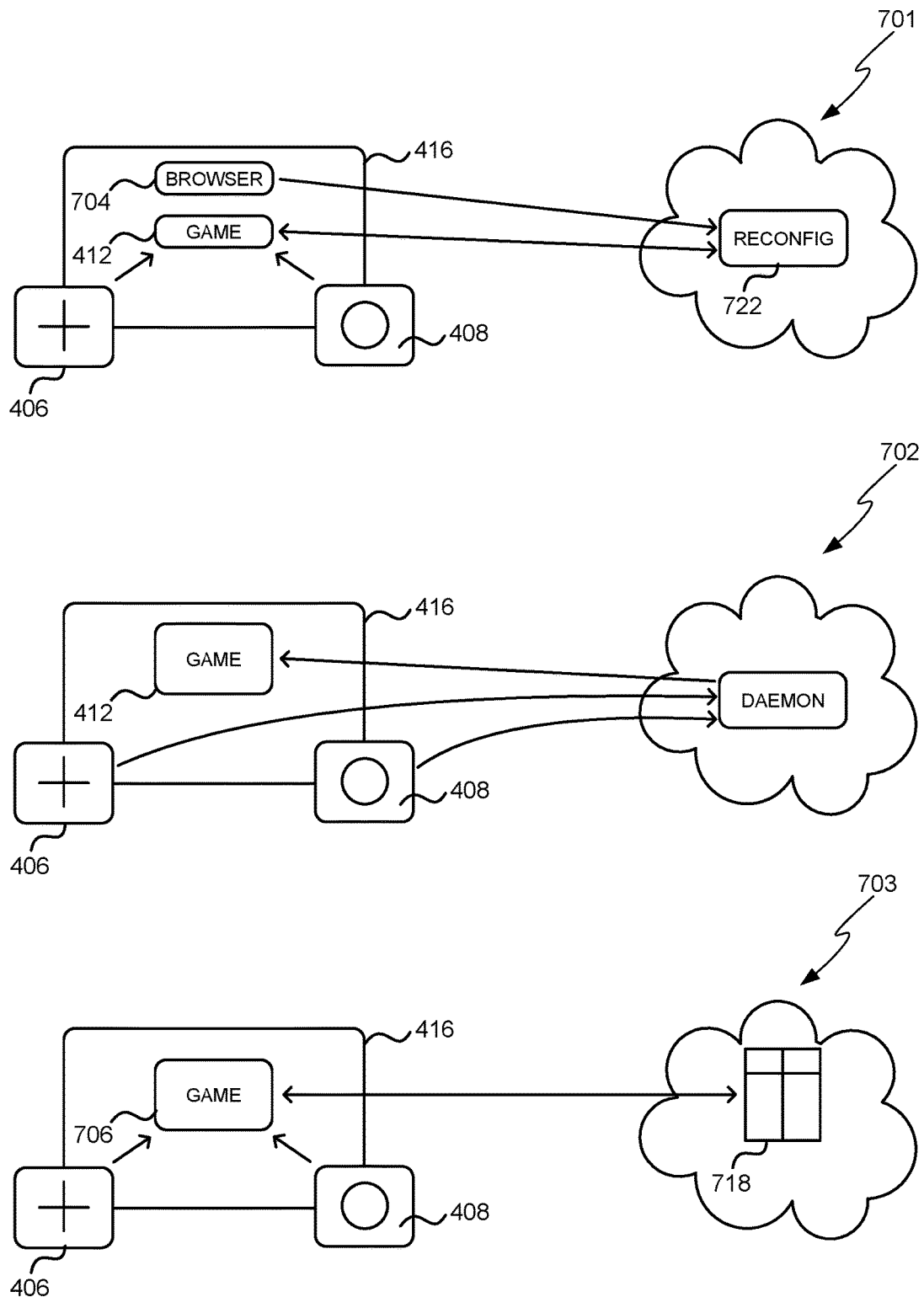
FIG. 7 shows schematic diagrams of three further example methods of mapping inputs on an input/output module to a user input in a target program.

In the examples shown in FIG. 4, the reconfiguration application 422, daemon 420 and mapping table 418 are stored locally on the touch-screen device 416. However, as shown in the examples of FIG. 7, these elements may alternatively be located remotely from the touch-screen device and may be accessed via a network (e.g. over the internet). In the first example 701, the reconfiguration application 722 runs as a web service on a remote server (e.g. a cloud service) and is accessed via a browser 704 running on the touch-screen device 416. In this example, the browser 704 opens a website which triggers the web service to reconfigure the modules 406, 408 according to the particular game 412 which is going to be played. Similarly, in the second example 702, the daemon 720 runs as a remote web service (e.g. a cloud service). As in the corresponding example in FIG. 4, the daemon 720 translates the signals from the modules into input signals which are recognized by the game 412. In the third example 703, there is an online database 718 which stores mapping data (e.g. in the form of a mapping table or various libraries) and which may be accessed by a game 706 and used to map the input signals received by the game from the input/output modules.

The example flow diagrams shown in FIGS. 5 and 6 are also applicable to the systems shown in FIG. 7. In the first example 701, which corresponds to the flow diagram shown in FIG. 6, the reconfiguration application 722 receives a trigger signal (block 604) and transmits reconfiguration commands (block 606) and it may be the browser 704 which transmits the trigger signal (in block 602). In the second example 702, which corresponds to the flow diagram shown in FIG. 5, the daemon 720 receives the signals from the input/output modules (block 508) and maps these to user inputs within the target program (block 510) before transmitting corresponding user input signals to the target program (block 512). In the third example 703, which also corresponds to the flow diagram shown in FIG. 5, the game 706 receives the input signals from the input/output modules (block 508) and uses the remotely stored mapping information 718 when performing the mapping (block 510). In some examples, the game 706 may select mapping information to use from the remote mapping information 718 (block 514) prior to performing the mapping (block 510).

In the examples described above, the target program is running on the touch-screen device. However, in some examples, the target program may be running on a separate device (e.g. a games console or smart TV, i.e. a television with interactive media capabilities) and the intermediary (e.g. the daemon described above) may be running on the touch-screen device. Such an example is shown in the schematic diagram in FIG. 8 and in this example the separate device is a games console 802 by way of example only. The game 804 is the target program, which runs on the separate device 802 and need not be modified to work with the input/output modules 406, 408. A daemon 806 running on the touch-screen device 416 receives the signals from the input/output modules 406, 408 (e.g. as in block 508 in FIG. 5), maps these to user inputs within the game 804 (e.g. as in block 510) and then transmits these to the game (e.g. as in block 512). In this way, the touch-screen device 416 with input/output modules 406, 408 and running daemon 806 (and which collectively may be denoted 808) can operate as a games controller for games console 802. By using different daemons or reconfiguring the daemon, the combined device 808 may operate as a controller or remote control for different devices (e.g. in addition to games console 802) and/or different target programs.

Figure 8:
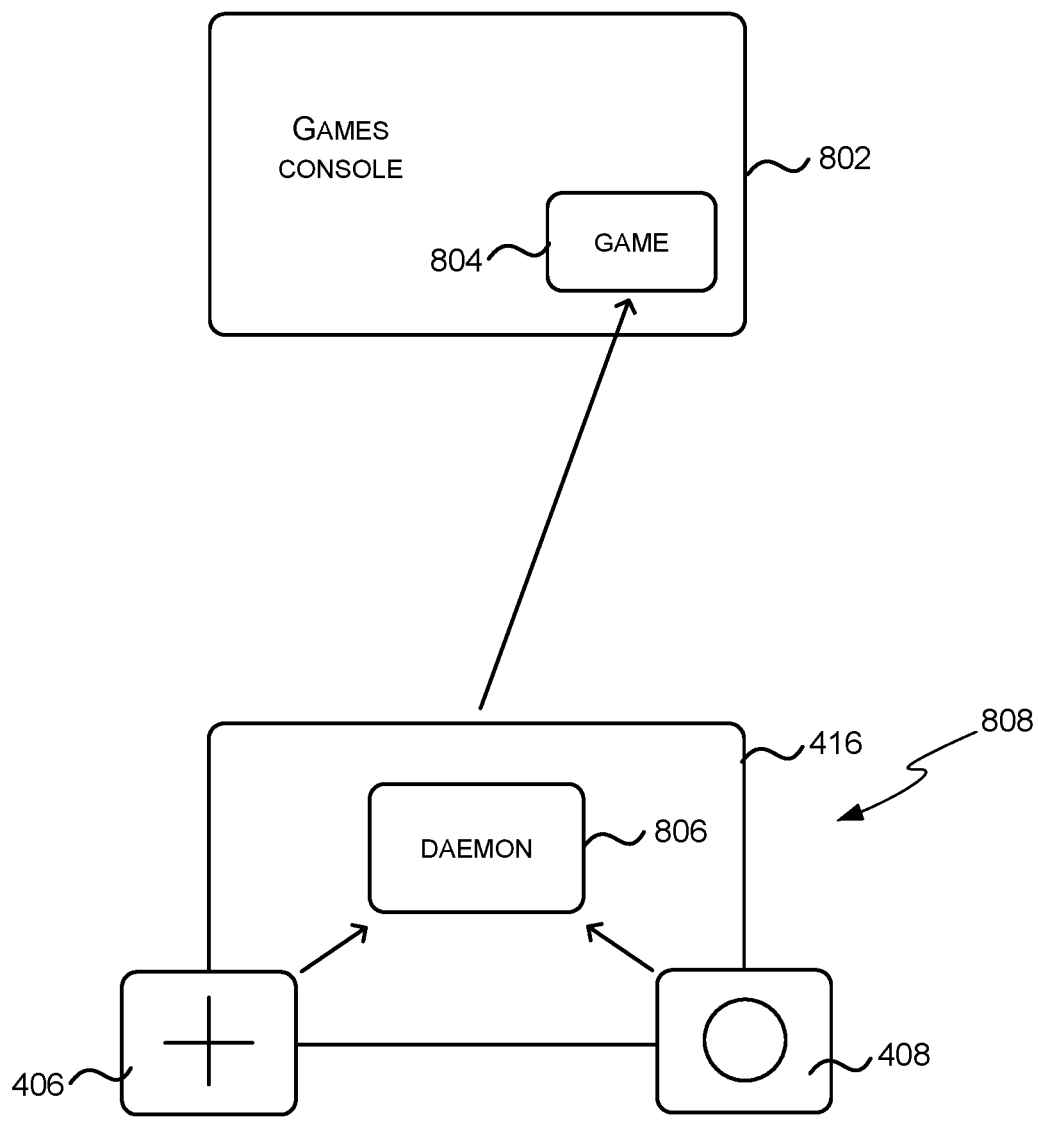
FIG. 8 shows schematic diagrams of another example method of mapping inputs on an input/output module to a user input in a target program.

FIG. 9 shows a schematic diagram of a games controller 902 which comprises two halves 904, 906, each of which is operable as an input/output module as described above when the two are separated from each other and the entire device 902 (when the two halves are joined together) operates as a standard games controller. When separated, the two halves can be attached around the periphery of a touch-screen device 908 in the same way as the input/output modules described above. When the two halves 904, 906 are attached to a touch-screen device, they may be used to provide user inputs to a target program running on the touch-screen device itself (e.g. as shown in FIGS. 4-7) or to a target program running on a separate device (e.g. as shown in FIG. 8). Where the games controller 902 uses a proprietary wireless protocol, each half 904, 906 may communicate (e.g. using a wire-free communication element 212) with the touch-screen device 908 via a communications module which may be connected to the touch-screen device using a wired connector (as described above).

It will be appreciated that the shape of the games controller 902 shown in FIG. 9 is by way of example only and the games controller may be of any shape. Depending on the size of the touch-screen device 908 and the games controller 902, the size of each half 904, 906 may not be much smaller than the touch-screen device 908 to which they attach, e.g. if the touch-screen device 908 is a smartphone rather than a tablet, (unlike the earlier schematic drawings of input/output modules).

Although the present examples are described and illustrated herein as being implemented to provide user inputs to games, the system described is provided as an example and not a limitation. As those skilled in the art will appreciate, the present examples are suitable for application in a variety of different types of target applications. Furthermore, although much of the description relates to hand-held or portable touch-screen devices (which may also be referred to as mobile computing devices), the examples may also be applied to fixed or non-portable touch-screen devices. In addition, although many of the examples described above relate to the modules being attached around the periphery of the mobile computing device, in other examples, they may be attached to other non-display portions of the device, such as the rear face of the device. In some examples, the attachment mechanism may attach to only non-display portions of the device and in other examples, the attachment mechanism may attach to both non-display portions and display portions of the device (e.g. the attachment mechanism may attach to a small part of the display, as well as to non-display portions, and still obscure little or none of the actual display area).

Touch-screen devices are an example type of computing devices which comprise a flat, continuous interaction surface. Although the description refers to use of input/output modules with a touch-screen device, the modules may alternatively be used with other devices which comprise a flat, continuous interaction surface (e.g. a surface which uses non-contact sensing such as depth sensor or eye tracker and may also provide other input means to a user such as pen, gesture and speech input).

Additionally, although the input/output modules described above are intended to be used when attached to a touch-screen device, it will be appreciated that they could be clipped to a case or housing of the touch-screen device or to other objects which are close to the touch-screen device such that the wire-free communication element can still communicate with the touch-screen device.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A set of reconfigurable input/output modules comprising at least two input/output modules, at least one of the input/output modules comprising:
   an attachment mechanism for attaching the module to a position on a portion of a computing device including a touch screen;
   an input control for providing user input to the computing device;
   a depth camera configured to capture depth images usable for gesture detection;
   an accelerometer configured to provide a signal usable for detecting movement of the at least one of the input/output modules; and
   a wireless communication element configured to communicate with at least one of the computing device or another input/output module, wherein the wireless communication element is configured to transmit signals indicative of user inputs received via the input control to at least one of the computing device or another input/output module.

2. The set of reconfigurable input/output modules of claim 1, wherein the wireless communication element is further configured to transmit depth images captured by the depth camera to the computing device.

3. The set of reconfigurable input/output modules of claim 1, wherein the wireless communication element is further configured to transmit the signal usable for detecting movement of the at least one of the input/output modules to the computing device.

4. The set of reconfigurable input/output modules of claim 1, wherein at least one of the input/output modules further comprises a processor configured to:
   receive a reconfiguration signal including reconfiguration instructions for changing at least one of the signals indicative of user inputs that are generated by at least one of the input/output modules in response to input to the input control; and
   implement the reconfiguration instructions based on the input control.

5. The set of reconfigurable input/output modules of claim 4, wherein the processor is configured to implement the reconfiguration instructions by changing the at least one of the signals indicative of user inputs to a signal expected by a target program being executed on the computing device.

6. The set of reconfigurable input/output modules of claim 5, wherein the wireless communication element is configured to transmit the signal expected by the target program to the computing device in response to input to the input control.

7. The set of reconfigurable input/output modules of claim 1, wherein at least one of the input/output modules further comprises an output device configured to provide output selected from the group consisting of a visual indicator, an audible indicator, a tactile feedback, a temperature feedback, and an olfactory feedback.

8. The set of reconfigurable input/output modules of claim 1, wherein the input control is configured to be removably attachable to at least one of the input/output modules.

9. The set of reconfigurable input/output modules of claim 8, wherein at least one of the input/output modules is configured to removably attach to a plurality of different input controls.

10. The set of reconfigurable input/output modules of claim 9, wherein the plurality of different input controls include a four-way input control, a button input control, a tactile input control, an optical sensor input control, a capacitive sensor input control, and a joystick input control.

11. The set of reconfigurable input/output modules of claim 1, wherein each input/output module includes an input control, and wherein the set of reconfigurable input/output modules is configured to concurrently receive user input from more than one user.

12. The set of reconfigurable input/output modules of claim 11, wherein the at least two input/output modules are configured as a first pair of input/output modules configured to receive user input from a first user, and wherein the set of reconfigurable input/output modules further comprises a second pair of input/output modules configured to receive user input from a second user.

13. A set of reconfigurable input/output modules comprising at least two input/output modules, at least one of the input/output modules comprising:
   a processor configured to receive a reconfiguration signal including reconfiguration instructions for changing at least one of the signals indicative of user inputs that are generated by at least one of the input/output modules in response to input to the input control, and implement the reconfiguration instructions based on the input control;
   an attachment mechanism for attaching the module to a position on a portion of a computing device including a touch screen;
   an input control for providing user input to the computing device;
   a depth camera configured to capture depth images usable for gesture detection; and
   a wireless communication element configured to communicate with at least one of the computing device or another input/output module, wherein the wireless communication element is configured to transmit signals indicative of user inputs received via the input control and depth images captured by the depth camera to at least one of the computing device or another input/output module.

14. The set of reconfigurable input/output modules of claim 13, wherein the processor is configured to implement the reconfiguration instructions by changing the at least one of the signals indicative of user inputs to a signal expected by a target program being executed on the computing device.

15. The set of reconfigurable input/output modules of claim 14, wherein the wireless communication element is configured to transmit the signal expected by the target program to the computing device in response to input to the input control.

16. A set of reconfigurable input/output modules comprising at least two input/output modules, at least one of the input/output modules comprising:

an attachment mechanism for attaching the module to a position on a portion of a computing device including a touch screen;

an input control for providing user input to the computing device, wherein the input control is configured to be removably attachable to at least one of the input/output modules;

a depth camera configured to capture depth images usable for gesture detection; and a wireless communication element configured to communicate with at least one of the computing device or another input/output module, wherein the wireless communication element is configured to transmit signals indicative of user inputs received via the input control and depth images captured by the depth camera to at least one of the computing device or another input/output module.

17. The set of reconfigurable input/output modules of claim 16, wherein at least one of the input/output modules is configured to removably attach to a plurality of different input controls.

18. The set of reconfigurable input/output modules of claim 17, wherein the plurality of different input controls include a four-way input control, a button input control, a tactile input control, an optical sensor input control, a capacitive sensor input control, and a joystick input control.

* * * * *